March 31, 1936. R. J. WEAVER Re. 19,911

SUCTION CONTROLLED GOVERNOR

Original Filed March 26, 1928

Inventor
R. J. Weaver

By Clarence O'Brien
Attorney

Reissued Mar. 31, 1936

Re. 19,911

UNITED STATES PATENT OFFICE 19,911

SUCTION CONTROLLED GOVERNOR

Ray J. Weaver, Shelby, Ohio, assignor to Hoof Products Company, Chicago, Ill., a corporation of Illinois Original No. 1,726,725, dated September 3, 1929, Serial No. 264,772, March 26, 1928. Application for reissue December 27, 1932, Serial No. 649,085

6 Claims. (Cl. 137—152)

The present invention relates to a suction controlled governor, and has for its prime object to provide a unit that occupies the space between the carburetor and the intake manifold, and has a suitable connection at this point for controlling automatically the suction therethrough. If desired, the governor units may be built in the carburetor.

Another very important object of the invention resides in the provision of a governor of this nature which is thoroughly efficient and reliable in operation, extremely sensitive to the lead load variations, and permits the use of all the available power of the engine at any speed setting.

Another very important object of the invention resides in the provision of a governor of this nature which does not interfere with the speed or throttle action of the carburetor of the automobile up to the speed setting of the governor, so that, by opening the carburetor governor wide, the governor will maintain an even speed.

A still further very important object of the invention resides in the provision of a governor of this nature which is simple in its construction, strong and durable, easy to install, thoroughly dependable, not likely to easily become out of order, and otherwise well adapted to the purpose for which it is designed.

With the above and numerous other objects in view, as will appear as the description proceeds, the invention resides in certain novel features of construction, and in the combination and arrangement of parts as will hereinafter more fully be described and claimed.

Figure 1:
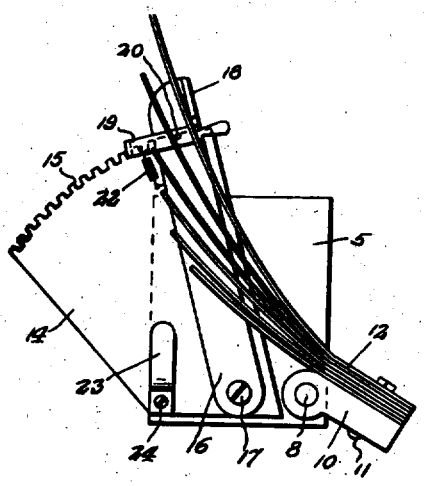
Figure 1 is a side elevation of the governor embodying the features of my invention.
Figure 2:
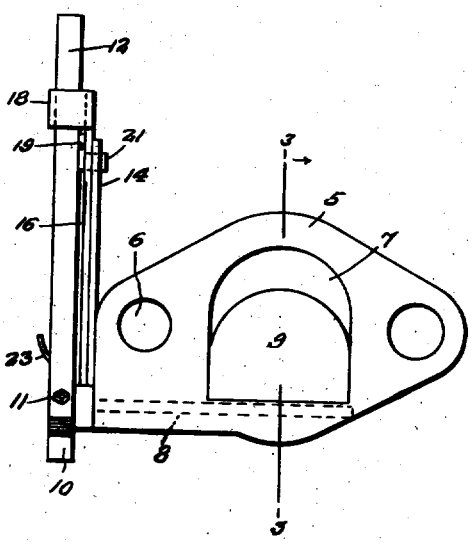
Figure 2 is an end elevation thereof.
Figure 3:
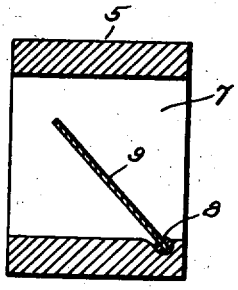
Figure 3 is a vertical section through the block of the governor.
Figure 4:
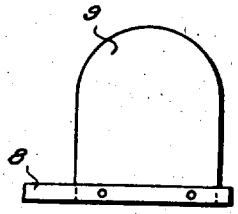
Figure 4 is a detail view of the flap valve.

Referring to the drawing in detail, it will be seen that the numeral 5 denotes a block which is shaped to fit between the carburetor and intake manifold, and has openings 6 to receive the usual bolts to secure the carburetor and intake manifold together. This block 5 is provided with a passage 7 therethrough, registering with the passage in the intake manifold. A shaft 8 is journaled in the block 5, and extends through the bottom of the passage 7, adjacent the end adapted to communicate with the intake manifold. This shaft is split in the portion disposed in the passage 7 for receiving the lower edge of a flap valve 9, which is of such size and shape as to close the passage, but normally inclines toward the carburetor, that is against the flow of the mixture through the passage.

The shaft 8 extends out through one side of the block 5, and secured thereto is a crank 10, which extends in an opposite direction from the shaft than the flap valve 9. On this crank 10 there is anchored, by means of a bolt or in any other suitable manner, as at 11, a plurality of spring leaves which constitute the multiple leaf spring 12. The leaf of the spring 12 adjacent the crank 10 is shorter than the other leaves, and said other leaves are graduated in increasing lengths. The ends anchored by the bolt 11 are in contact, but the outer portions of the leaves may diverge from each other, as is indicated in Figure 1.

A plate 14 is secured to one side of the block 5, and has an arcuate upper edge with a series of notches or teeth, as indicated at 15. A stop arm 16 is pivoted at its lower end, as at 17, on the plate, and at its free end is provided with a stop projection 18. A spring pressed catch 19 is pivoted as at 20 on the arm 16, and has a lateral member 21 engageable in the notches formed by the teeth 15, the spring 22 being attached to the catch and to the arm. The longest spring leaf is abutable with the projection 18. The shortest leaf is abutable with a stop arm 23, fixed as at 24 to the plate 14.

The valve leans toward the passing air which tends to catch the valve, raise it, and close the passage. As the valve tends to close the passage, it crowds and presses the leaves together against the speed regulating stop arm 16, until their combined resistance equals the pull on the valve which checks the speed of the engine. When the load the engine is pulling becomes greater, the speed of the engine will naturally become slower, if the throttle is not opened. The governor unit is, however, the throttle, and it does open. As the speed of the engine slackens, the suction becomes less, causing less pull on the valve which will consequently be forced open further by the multiple leaf spring, until their resistance equals the pull on the valve once again. This action is even and uniform and will maintain an even engine speed.

It can readily be seen that as the surface of the valve becomes less and les angular with respect to the passing of the mixture through the passage, the pull of the valve will gradually become less. The multiple leaf spring is easily designed and arranged to decrease in resistance in a corresponding manner with the decreasing pull on the valve as it opens. The action of the spring in connection with the valve causes the variable resistance in the passage that controls the engine speed evenly under varying loads.

Obviously, the arm 16 may be held in different adjusted positions by means of the catch 19, and thus the speed can be fixed as desired. The stop arm 23 catches the shortest leaf and prevents the valve from falling so low that the suction of the mixture will not catch it. This governor is very efficient. It is extremely sensitive to the least load variation, and permits the use of all of the available power of the engine at any speed setting. It does not interfere with the speed or throttle action of the carburetor of an automobile, up to the speed setting of the governor, and then by opening the carburetor governor wide, the governor will maintain an even speed on the road. This governor would be very effective for delivery car owners who do not want their delivery cars driven over a given speed. The governor is entirely dependable.

It is free from parts that are apt to get out of order. It is long lived because there are practically no moving parts. It is simple in construction, with no parts to get out of order and it requires no oil and consequently no attention. It is easily installed, requiring no complicated adjustments.

It is thought that the construction, operation, utility and advantages of the governor will now be quite apparent to those skilled in this art, without a more detailed description thereof. The present embodiment of the invention has been disclosed in detail by way of example, since in actual practice it attains the features of advantage enumerated as desirable in the statement of the invention and the above description.

It will be apparent that changes in the details of construction, and in the combination and arrangement of parts may be resorted to without departing from the spirit and scope of the invention as hereinafter claimed, or sacrificing any of its advantages.

Having thus described my invention, what I claim as new is:

1. A suction controlled governor of the class described comprising a block with a passage therethrough, a valve for controlling the passage, said valve being actuated by the force of the fluid flowing through the passage, spring means operably connected with the valve to overcome the operation of the valve by the force of the flow of fluid at a predetermined point, said spring means comprising a plurality of spring leaves with diverging ends, and an abutment against which one of the ends engages.

2. A suction controlled governor of the class described comprising a block with a passage therethrough, a valve for controlling the passage, said valve being actuated by the flow of the fluid through the passage, spring means operably connected with the valve to overcome the operation of the valve by the force of the flow of fluid at a given position of the valve, said spring means comprising a plurality of spring leaves with diverging ends, and an abutment against which one of the leaves engages, said leaves gradually decreasing in length from the one engageable with the abutment, and means for adjusting the abutment.

3. A suction controlled governor of the class described comprising a block with a passage therethrough, a valve in the passage, a shaft journaled in the block to which the valve is fixed, a crank on the shaft, a multiple leaf spring anchored to the crank and having the ends of the leaves diverging from one another, and an abutment against which one of the leaves engages, so that the spring will tend to maintain the valve inclined in a direction from which the mixture is sucked through the passage.

4. A suction controlled governor of the class described comprising a block having a passage therethrough, a valve in the passage to which the valve is fixed, a shaft thereon, a crank on the shaft, a plurality of spring leaves anchored to said crank and having their ends diverging from one another, an abutment against which one of the leaves engages so that the leaves will tend to maintain the valve inclined in a direction from which the mixture is sucked through the passage, a pivoted arm on which the abutment is mounted, and means for holding the arm in different adjusted positions.

5. In a suction control governor, the combination of a conduit and an unbalanced valve movably mounted therein upon a pivot adjacent one side wall of said conduit, said valve subject to actuation by the flow of fluid through said conduit, and a multiple leaf spring operatively connected with said pivot, the leaves of said spring being of different lengths and fixedly mounted at one end to resist closing movement of said valve, directly in proportion to the suction tending to close the same.

6. A suction controlled governor of the class described comprising a block with a passage therethrough, a valve for controlling the passage, said valve being actuated by the flow of the fluid through the passage, spring means operably connected with the valve to overcome the operation of the valve by the suction at a given position of the valve, said spring means comprising a plurality of spring leaves with diverging ends, and an abutment against which one of the leaves engages, said leaves gradually decreasing in length from the one engageable with the abutment, and means for changing the position of said spring means with respect to the abutment to either increase or decrease the spring resistance to opening movement of said valve.

RAY J. WEAVER.